UNITED STATES PATENT OFFICE.

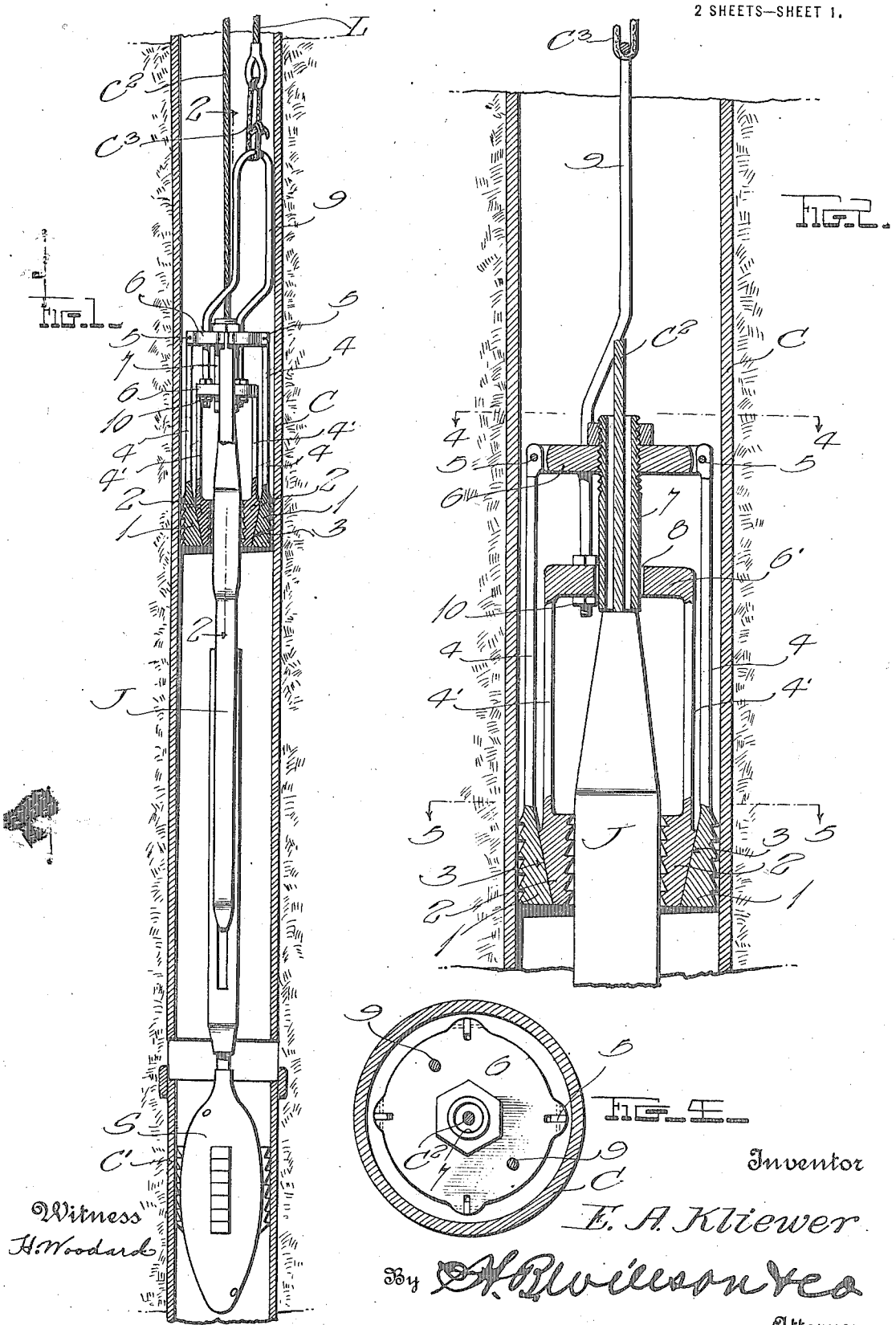

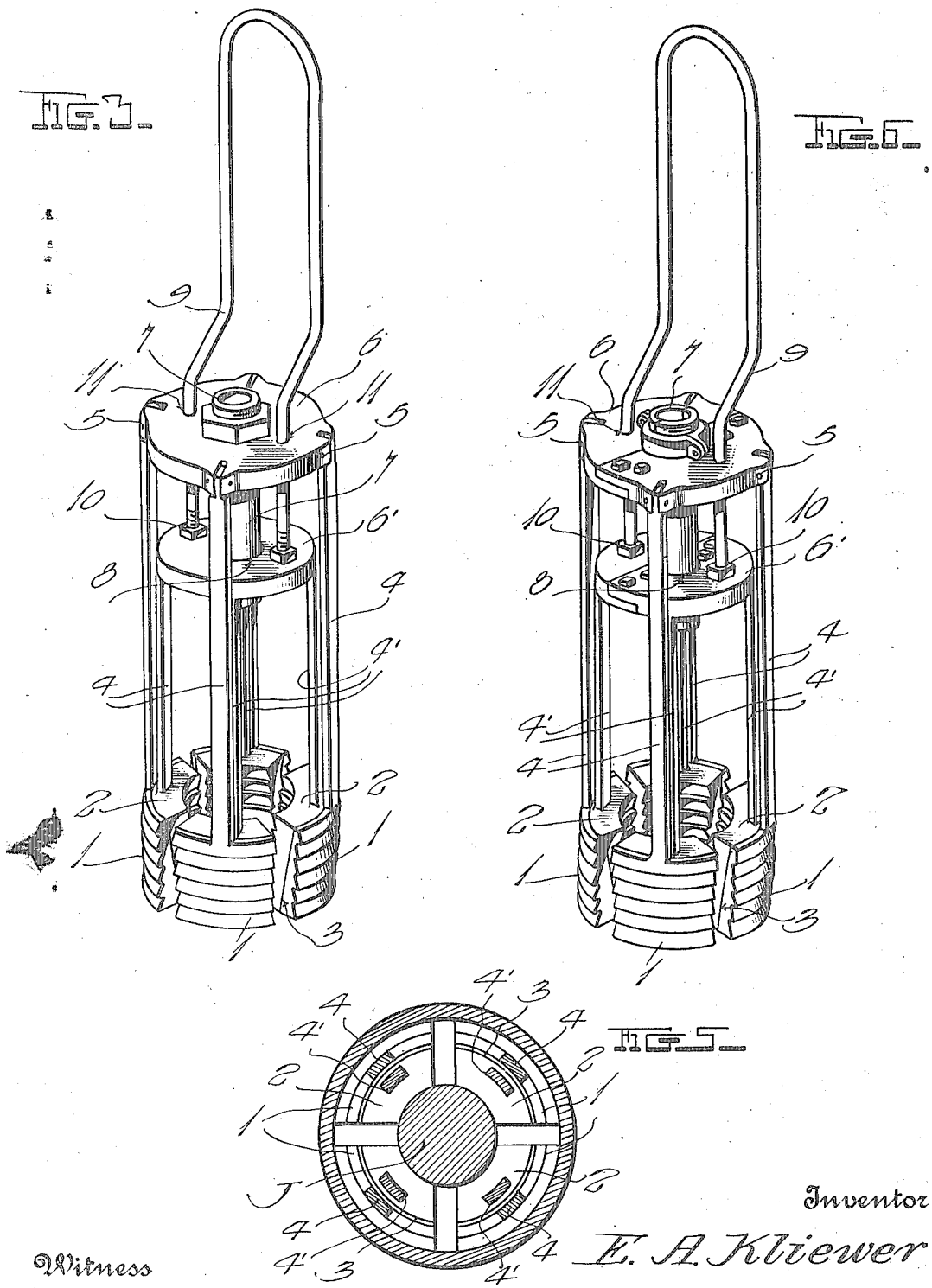

EDWARD A. KLIEWER, OF FAIRVIEW, OKLAHOMA.

WELL CASING AND TOOL FISHING DEVICE.

1,266,821.

Specification of Letters Patent. Patented May 21, 1918.

Application filed February 21, 1918. Serial No. 218,486.

*To all whom it may concern:*

Be it known that I, EDWARD A. KLIEWER, a citizen of the United States, residing at Fairview, in the county of Major and State of Oklahoma, have invented certain new and useful Improvements in Well Casing and Tool Fishing Devices; and I do declare the following to be a full, clear, and exact description of the invention, such as will enable others skilled in the art to which it appertains to make and use the same.

My invention has for its object to provide an extremely simple and inexpensive, yet a highly efficient device for fishing tools and casings from wells, it being my intention to provide means for connecting two parted sections of the casing, so that raising of the upper section will carry with it the lower section.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a side elevation of the tool partly broken away and in section showing it in use;

Fig. 2 is an enlarged vertical section on the plane of the line 2—2 of Fig. 1;

Fig. 3 is a perspective view of the form of the invention shown in Figs. 1 and 2;

Figs. 4 and 5 are horizontal sectional views on the planes of the lines 4—4 and 5—5 of Fig. 2; and Fig. 6 is a perspective view showing a slightly different form of the invention.

In the drawings above briefly described, the numerals 1 designate the individual toothed jaws of an outer series, said jaws being adapted to expand and grip the casing C as shown in Figs. 1 and 2. Surrounded by the outer series of jaws, is an inner series of contracting jaws 2 having teeth for gripping the usual jar J when the latter carries on its lower end a spear S to grip a lower casing section C'. The jaws 1 and 2 are formed with coacting wedge faces 3 which serve to expand the outer series of jaws in the casing and to contract the inner series around the tool J at the proper time.

Arms 4 rise from the jaws 1 and at 5 are pivoted in notches in the edge of a horizontal disk-like head 6, while other arms 4' rise from the jaws 2 and are suitably joined to a lower disk-like head 6', said arms 4' being more or less resilient. A tubular cable guide 7 is suitably secured to the center of the head 6 and depends therefrom, said guide being received slidably in a central opening 8 formed in the head 6'. A preferably arched suspending rod or other device 9 is secured at 10 to the head 6' and rises slidably through openings 11 in the head 6, the upper end of said suspending device being off-set laterally from the axis of the tool in order that it may interfere in no manner with the usual cable $C^2$ which passes through the guide 7 and is connected to the jar J by the usual socket.

The device may be constructed as featured in Figs. 1 to 5, or as seen in Fig. 6, the heads 6 and 6' and the guide 7 may be forged in two parts to permit the tool to be more easily applied to the cable $C^2$. In either case, the operation and advantages are similar.

In use, after the spear S has been lowered by the jar J and the cable $C^2$, and properly engaged with the lower casing section C', the present invention is lowered by the sand line L to which the suspending device 9 is connected by a cord or other easily breakable connection $C^3$. By means of the cable guide 7, the tool follows the cable $C^2$ until the lower end of said guide strikes the upper end of the jar J located in the lower end of the upper casing section C. When this takes place, downward movement of the upper head 6 of the jaws 1 is prevented, but head 6' and its jaws 2 continue to descend to such an extent as to cause the wedge faces 3 to contract said inner jaw 2 around the jar J and to simultaneously expand the jaws 1 against the casing section C. By now connecting the usual hoisting means to the upper end of said casing section C, this section may be raised and through the instrumentality of the jaws 1 and 2, the jar J is forced to move bodily upward, with the result that the spear S similarly moves the lower casing section C'. At a suitable time, the sand line L is pulled sufficiently hard to break the connection $C^3$ and it is then removed from the casing. This having been done, an ordinary cable cutting tool is lowered into the casing and the cable $C^2$ is severed near its lower end. These operations having been performed, the withdrawal of the casing is continued.

From the foregoing, taken in connection with the accompanying drawings, it will be obvious that although my invention is of extremely simple and inexpensive nature, it will be highly efficient for the purpose set forth. It may be stated however that the device is not restricted to this particular use, nor to the exact details of construction except as set forth in the following.

I claim:

1. A well casing and tool fishing device having an inner set of contracting tool gripping jaws, and an outer set of expanding casing gripping jaws surrounding said tool gripping jaws, said sets of jaws having means for simultaneously expanding the outer set and contracting the inner set when the latter set properly surrounds the tool in the casing.

2. A structure as specified in claim 1, said expanding and contracting means comprising coacting wedge faces on said inner and outer jaws.

3. A well casing and tool fishing device having an inner set of contracting tool gripping jaws, and an outer set of expanding casing gripping jaws surrounding said tool gripping jaws, said sets of jaws having means for simultaneously expanding the outer set and contracting the inner set when the latter set properly surrounds the tool in the casing, arms rising from the jaws of both sets, an upper head to which the arms of the outer series are attached at their upper ends, a lower head to which the upper ends of the arms of said inner series are attached, a tubular cable guide depending from the upper head and passing slidably through the lower head, and a suspending device passing slidably through said upper head and secured to said lower head.

4. A well casing and tool fishing device having an inner set of contracting tool gripping jaws, and an outer set of expanding casing gripping jaws surrounding said tool gripping jaws, said sets of jaws having coacting wedge faces for simultaneously expanding the outer set and contracting the inner set when the latter set properly surrounds the tool in the casing, arms rising from the jaws of both sets, an upper head to which the arms of the outer set are attached at their upper ends, a lower head to which the upper ends of the arms of the inner set are attached, a tubular cable guide depending from said upper head and passing slidably through said lower head, and a suspending device rising from said lower head and sliding through said upper head.

In testimony whereof I have hereunto set my hand in the presence of two subscribing witnesses.

EDWARD A. KLIEWER.

Witnesses:
W. O. ROTHE,
W. G. McCLUSKEY.